United States Patent Office 2,920,066
Patented Jan. 5, 1960

2,920,066

PROCESS AND CATALYST FOR PRODUCTION OF OLEFIN POLYMERS

Gene Nowlin and Harold D. Lyons, Bartlesville, Okla., assignors to Phillips Petroleum Company, a corporation of Delaware No Drawing. Application April 25, 1955
Serial No. 503,797

8 Claims. (Cl. 260—94.9)

This invention relates to the polymerization of olefins. In one aspect, this invention relates to an improved method for polymerizing olefins in the presence of a novel catalyst system.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. The most valuable polymers, however, are higher molecular weight polymers which have desirable properties of heat stability and can be molded into vessels, pipes and tubing.

It has now been discovered that an unexpected improvement is obtained when an olefin such as ethylene is polymerized in the presence of a catalyst composition comprising a mixture of a hydride of titanium and an organometal halide corresponding to the formula $R_nMX_y$ wherein R is a saturated acyclic hydrocarbon radical, a saturated cyclic hydrocarbon radical, an aromatic hydrocarbon radical, or combinations of these radicals, wherein M is a metal selected from the group consisting of aluminum, gallium, indium, thallium, and beryllium and wherein X is a halogen, and wherein $n$ and $y$ are integers, the sum of $n$ and $y$ being equal to the valence of the metal. The improvement obtained when polymerizing an olefin in the presence of our novel catalyst is, firstly, that polymers of much higher molecular weight can be obtained than is true when certain of the prior art catalysts have been employed, and secondly, the polymerization reaction, particularly for ethylene, can be initiated and carried out at considerably lower temperatures and pressures than are necessary when employing the catalysts and processes of the prior art.

Our catalyst comprises a mixture of a titanium hydride and at least one organometal halide corresponding to the formula $R_nMX_y$, wherein R is a saturated acyclic hydrocarbon radical, a saturated cyclic hydrocarbon radical, an aromatic hydrocarbon radical, or mixtures of these radicals, wherein M is a metal selected from the group consisting of aluminum, gallium, indium, thallium and beryllium, and wherein X is a halogen. The $n$ and $y$ are integers and the sum of $n$ and $y$ is equal to the valence of the metal M. X can be any of the halogens, including chlorine, bromine, iodine and fluorine. The saturated acyclic hydrocarbon radicals, saturated cyclic hydrocarbon radicals, and aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following: $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$, $C_{20}H_{41}GaBr_2$, $(C_{14}H_{29})_2GaF$ $(C_6H_5)_2InCl$, $C_8H_{17}InF_2$, $(C_6H_{11})InBr_2$ (cyclohexane derivative), $C_{17}H_{35}BeI$, $CH_3BeBr$ and the like.

The catalyst composition falling within this disclosure which is preferred because its use to catalyze the polymerization of olefins provides the relatively high molecular weight polymers and/or permits the use of the relatively low reaction temperatures and pressures is; a mixture of titanium hydride with an approximately equimolar mixture of ethylaluminum dichloride and diethylaluminum chloride.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of organometal halide having the formula $R_nMX_y$ to titanium hydride is in the range of 0.05 to 50, preferably 0.1 to 5, mols of organometal halide per mol of titanium hydride.

The materials which are polymerized, in accordance with this invention, are polymerizable hydrocarbons, broadly. Preferably, the polymerizable hydrocarbons are olefins containing a $CH_2=C<$ radical. The most preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylene can also be used, such as butene-2, pentene-2, hexene-2, heptene-3, 2-methyl-butene-1, 2-methyl-hexene-1, 2-ethyl-heptene-1, and the like. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a pentene. Also, aryl olefins, e.g., styrene and alkyl-substituted styrenes can be polymerized to a solid polymer in the process of this invention.

One of the important advantages obtained in the polymerization of olefins in the presence of our novel catalyst is that lower temperatures and pressures can be used than in certain of the prior art processes. The temperature can be varied over a rather broad range, however, such as from 100 to 500° F. The preferred temperature range is from 200 to 350° F. Although pressures ranging from atmospheric up to 30,000 p.s.i.g. or higher can be employed, a pressure in the range of 100 to 1000 p.s.i.g. is usually preferred.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, cycloparaffins and/or aromatic hydrocarbons which are relatively inert, non-deleterious and liquid under the conditions of the process. The lower molecular weight alkans, such as propane, butane, and pentane, are especially useful when the process is carried out at low temperatures. However, the higher molecular weight paraffins and cycloparaffins, such as isooctane, cyclohexane, methylcyclohexane, and aromatic diluents, such as benzene, toluene, and the like, can also be used, particularly when operating at higher temperatures. Mixtures of these diluents can also be used.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends upon the temperature at which the process is carried out to a great extent. The residence time also varies with the specific olefin that is polymerized. However, the residence time for the polymerization of aliphatic monoolefins, within the preferred temperature range of 200 to 350° F., falls within the range of one second to an hour or more. In the batch process, the time for the reaction can vary widely, also, such as up to 24 hours or more.

Various materials are known to be poisons for the catalyst composition of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable, also, that air and moisture be removed from the reaction vessel before the reaction is carried out.

At the completion of the polymerization reaction, the catalyst is killed or inactivated by any suitable means such as by treatment with an alcohol, and the solid olefin polymer is separated from the diluent if such was used, for example by distillation, decantation or the like. The polymer is then washed with an alcohol or water or other suitable material and finally dried. If desired, the product can be comminuted in a suitable grinder or the like during the purification and/or washing steps. When the process of the invention is carried out continuously, the polymer, diluent and catalyst system are pumped out of the reactor, the catalyst is treated with a catalyst-inactivating material, such as an alcohol, the diluent and alcohol are separated from the polymer, for example by filtration, and the polymer is then dried to provide the desired polymeric product.

EXAMPLE I

Ethylene was polymerized in a 1200 cubic centimeter stainless steel rocking autoclave in the presence of a catalyst consisting of 3.0 grams of titanium hydride ($TiH_2$) and 3 grams of an approximately equimolar mixture of diethylaluminum chloride and ethylaluminum dichloride. The autoclave was charged with 500 cubic centimeters of cyclohexane (dried over sodium) prior to the addition of the catalyst components. The reactor was flushed with nitrogen prior to and during the charging procedure to prevent contact of the catalyst with air or moisture. The ethylene feed was passed through a purification system to remove oxygen, carbon dioxide, and water vapor prior to entering the autoclave. The purification system comprised a pyrogallol solution, a sodium hydroxide solution, and a drying agent.

The mixture of diethylaluminum chloride and ethylaluminum dichloride was prepared by placing 150 grams of aluminum shavings in a flask fitted with a reflux condenser and heated to about 70° C. A trace of iodine was added to the flask to act as a catalyst and ethyl chloride was charged to the flask in liquid phase. The temperature of the reaction mixture was maintained in the range 120 to 150° C. during the addition of ethyl chloride and the reaction mixture was maintained under a nitrogen atmosphere. When substantially all of the aluminum shavings had reacted with the ethyl chloride, the liquid product was removed from the flask and fractionally distilled at 4.5 millimeters mercury pressure in a packed distillation column. Four grams of the distillate, boiling at 72 to 74° C. at 4.5 millimeters mercury pressure, was used in the catalyst composition of this invention, as set forth above. This fraction boiling at 72 to 74° C. was analyzed and was found to contain 47.4 weight percent chlorine. The theoretical chlorine content for an equimolar mixture of diethylaluminum chloride and ethylaluminum dichloride is 43 weight percent.

The ethylene was added to the autoclave, which was at a temperature of about 75° F., until a pressure of 300 p.s.i.g. was reached. At this point the valve in the ethylene line near the autoclave was closed and the reactor and contents were heated up gradually. After a heating period of 25 minutes the temperature had increased to about 105° F. and the pressure had increased to about 425 p.s.i.g. The increase in pressure was in excess of that which was normally obtained with a 30-degree F. temperature rise, indicating that ethylene was leaking through the valve into the reactor. When this was noted, the main valve in the ethylene supply line was closed to prevent further leakage of ethylene into the system. The heating was continued and at the end of a total of three hours heating, the temperature had increased to about 271° F. and the pressure had increased to approximately 625 p.s.i.g. At this point it was noted that the pressure began to decrease, indicating that the polymerization reaction had been initiated. The reaction was allowed to continue for about one hour, at which time the heat to the reaction vessel was cut off. During this reaction period, the maximum temperature which was reached was about 291° F. Approximately one hour after the heating had been discontinued the reactor temperature had dropped to about 254° F. and the pressure had decreased to about 500 p.s.i.g. The reactor and contents were allowed to remain overnight, during which time they cooled to room temperature. The product which was obtained was a black solid polymeric material which had adsorbed or dissolved a major portion of the cyclohexane which was initially charged to the reactor. The unadsorbed solvent was filtered from the solid polymer. The polymer was then placed in a Waring Blendor together with isopropyl alcohol, using about 400 cubic centimeters of alcohol per 100 grams of swollen polymer. After being ground in this manner for about 30 minutes, the solid polymer was separated from the slurry. The ethylene polymer was a finely divided gray polymer.

The ethylene used in the example was obtained from The Matheson Company, Inc., Joliet, Illinois, and had a purity of 99.5 percent. The titanium hydride used in the example was obtained from Metal Hydrides, Inc., Beverly, Mass. A bulletin published by Metal Hydrides, Inc., entitled, "The Hydrimet Process," states that the titanium hydride ($TiH_2$) has a density of 3.75 grams per cubic centimeter at 25° C. and that the hydrogen content of 1 cubic centimeter of the titanium hydride at 25° C. is 1820 cubic centimeters measured under standard conditions of temperature and pressure.

The polymer produced in the process of Example I was compression molded and had the properties listed below in Table I.

Table I

| | |
|---|---|
| Density at 78° F., gr./cc. | 1.071 |
| Melting point, ° F. | 247 |
| Melt index | 15.0 |
| Molecular weight based on melt index value | 23,000 |

The polymers and copolymers produced in accordance with this invention have utility in applications where solid plastics are used. They can be molded to form articles of any desired shape, such as bottles and other containers for liquids. Also, they can be formed into pipe or tubing by extrusion.

As will be evident to those skilled in the art, many variations and modifications can be practiced within the scope of the disclosure and claims to this invention. The invention resides in an improved polymerization process for olefins, as described herein, comprising the use of a novel catalyst composition for the process and the polymers so produced, wherein said novel catalyst comprises a mixture of a hydride of titanium and organometal halides corresponding to the formula $R_nMX_y$, as described above.

We claim:

1. A method for polymerizing an aliphatic 1-olefin having up to and including 8 carbon atoms per molecule which comprises contacting said olefin with a catalyst comprising titanium hydride and an aluminum alkyl halide.

2. A method for polymerizing an aliphatic 1-olefin having up to and including 8 carbon atoms per molecule which comprises contacting said olefin with a catalyst comprising titanium hydride and an alkyl aluminum halide, the ratio of the amounts of said alkyl aluminum halide and said titanium hydride in said catalyst being in the range of from 0.05 to 50 mols of said alkyl aluminum halide per mol of said titanium hydride, said contacting occurring at a temperature in the range of 100 to 500° F., in the presence of a hydrocarbon diluent, inert and liquid under conditions of the method, and at a pressure sufficient to maintain said diluent in the liquid phase.

3. A method in accordance with claim 2 wherein said olefin is ethylene and said catalyst consists essentially of a mixture of titanium hydride, diethylaluminum chloride and ethylaluminum dichloride.

4. A method for polymerizing ethylene which comprises contacting said ethylene with a catalyst comprising titanium hydride and an alkyl aluminum halide containing up to and including 10 carbon atoms, the ratio of the amounts of said titanium hydride and said alkyl aluminum halide being in the range of from 0.05 to 50 mols of said alkyl aluminum halide per mol of said titanium hydride, said contacting occurring at a temperature in the range of from 100 to 500° F., in the presence of a hydrocarbon diluent, inert and liquid under conditions of the method, and at a pressure in the range of atmospheric to 35,000 p.s.i.g.

5. A method for polymerizing ethylene with comprises contacting said ethylene with a catalyst comprising titanium hydride and an alkyl aluminum chloride containing up to and including 10 carbon atoms, the ratio of the amounts of said titanium hydride and said alkyl aluminum chloride being in the range of from 0.1 to 5 mols of said alkyl aluminum chloride per mol of said titanium hydride, said contacting occurring at a temperature in the range of 100 to 500° F., in the presence of a hydrocarbon diluent, inert and liquid under conditions of the method, and at a pressure in the range of 100 to 1000 p.s.i.g.

6. A catalyst composition comprising titanium hydride and an alkyl aluminum halide, the ratio of the amounts of said titanium hydride and said alkyl aluminum halide being in the range of from 0.05 to 50 mols of said alkyl aluminum halide per mol of said titanium hydride.

7. A catalyst composition consisting essentially of a mixture of (a) titanium hydride and (b) a mixture of diethylaluminum chloride and ethylaluminum dichloride, the ratio of the amounts of said mixture of diethylaluminum chloride and ethylaluminum dichloride and said titanium hydride being in the range of from 0.05 to 50 mols of said mixture of diethylaluminum chloride and ethylaluminum dichloride per mol of said titanium hydride.

8. A method for polymerizing ethylene which comprises, contacting ethylene with a catalyst consisting essentially of a mixture of from 0.1 to 5 mols of a mixture of diethylaluminum chloride and ethylaluminum dichloride per mol of titanium hydride, in the presence of a hydrocarbon diluent, inert and liquid under conditions of the method, at a temperature in the range from 200 to 350° F. and a pressure in the range from 100 to 1000 p.s.i.g.

References Cited in the file of this patent

UNITED STATES PATENTS

| | | |
|---|---|---|
| 2,699,457 | Ziegler | Jan. 11, 1955 |
| 2,721,189 | Anderson et al. | Oct. 18, 1955 |
| 2,816,883 | Larchar | Dec. 17, 1957 |

FOREIGN PATENTS

| | | |
|---|---|---|
| 533,362 | Belgium | May 16, 1955 |
| 534,792 | Belgium | Jan. 31, 1955 |
| 534,888 | Belgium | Jan. 31, 1955 |